(12) United States Patent
Ito

(10) Patent No.: US 6,442,352 B1
(45) Date of Patent: Aug. 27, 2002

(54) DEVICE FOR OPENING AND CLOSING A COVER OF A FILM CARTRIDGE CHAMBER

(75) Inventor: Kenji Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/570,633

(22) Filed: May 15, 2000

(30) Foreign Application Priority Data

May 19, 1999 (JP) .......................................... 11-138310

(51) Int. Cl.[7] ................................................ G03B 17/02
(52) U.S. Cl. ....................................... 396/536; 396/538
(58) Field of Search .................................. 396/538, 536, 396/514, 72, 73, 75, 85, 132, 349

(56) References Cited

U.S. PATENT DOCUMENTS 6,085,043 A * 7/2000 Okuno ........................ 396/132
6,101,340 A * 8/2000 Kojima et al. ............... 396/536
6,104,881 A * 8/2000 Nishimura ................... 396/349

* cited by examiner

Primary Examiner—Christopher Mahoney
(74) Attorney, Agent, or Firm—Robin, Blecker & Daley

(57) ABSTRACT

A film cartridge chamber cover opening-and-closing device of a camera has a first lock member arranged to switch the state of a cartridge chamber cover between an unlocked state in which the cartridge chamber cover can be opened and a locked state in which the cover is kept closed, by using a power for transporting a film, and a second lock member arranged to switch the state of the cartridge chamber cover between the unlocked state and the locked state by using a power for driving a photo-taking lens barrel.

8 Claims, 14 Drawing Sheets

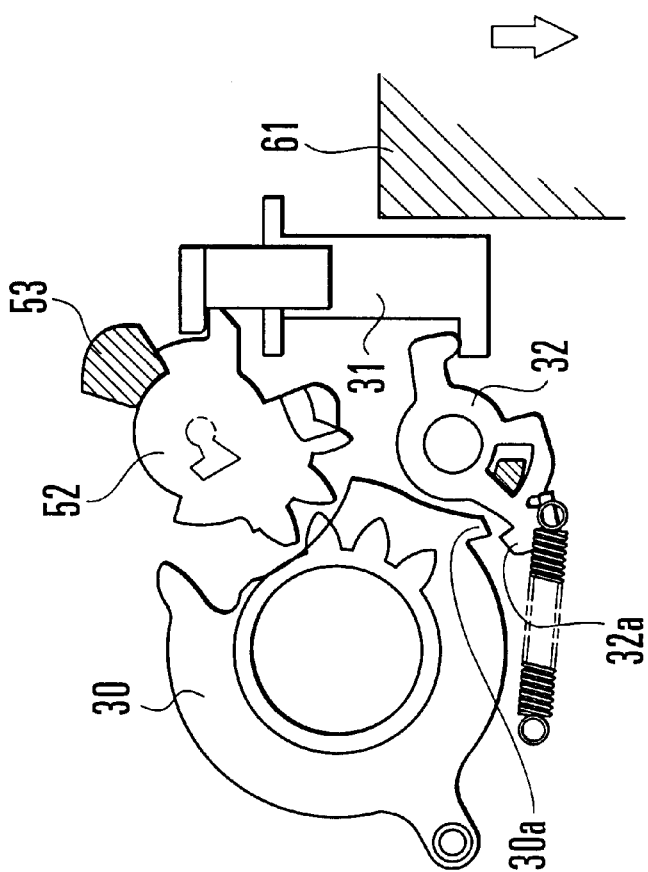
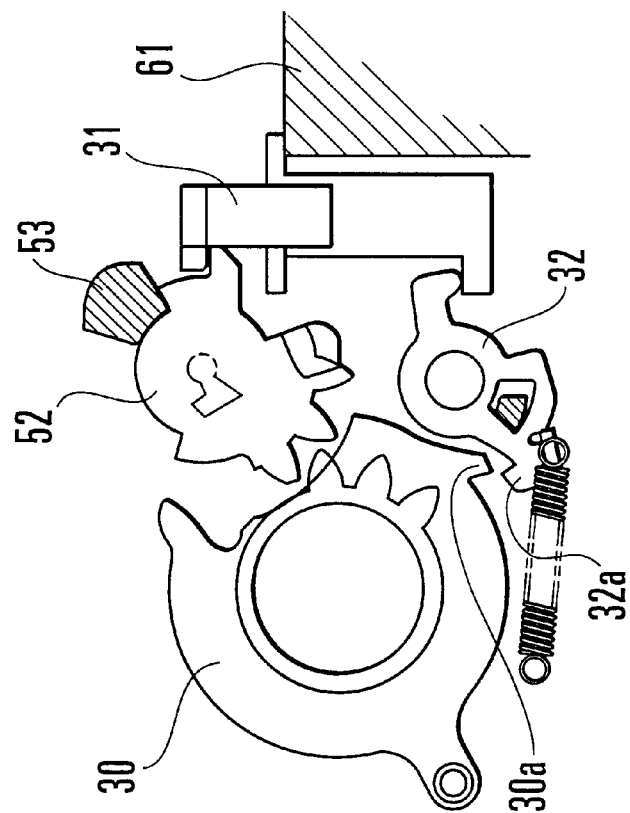
FIG. 16(a)
FIG. 16(b)

DEVICE FOR OPENING AND CLOSING A COVER OF A FILM CARTRIDGE CHAMBER

BACKGROUND OF THE INVENTION

1. Field of the Invention

The present invention relates to an improvement on a cartridge chamber cover locking device arranged to be capable of switching the state of a cover of a film cartridge chamber of a camera between an unlocked state in which the film cartridge chamber can be opened and a locked state in which the film cartridge chamber is kept closed.

2. Description of Related Art

A film cartridge of the so-called thrust type having a film stowed in a completely wound state therein including its leader part (hereinafter referred to simply as a cartridge) has become known during recent years. A camera adapted for the cartridge of this type is arranged to cause the film to be moved out from the cartridge by a film transport mechanism disposed within the camera and to take up and wind the film on a spool shaft of the camera when the camera is loaded with the cartridge. The camera of this kind permits the cartridge to be put into and taken out from a cartridge chamber in the axial direction of a supply spool of the cartridge. Therefore, the cover of the cartridge chamber can be disposed either on the upper or lower side of the camera body.

Further, the camera of this kind is arranged to set an indication of the usage state of the film, after completion of rewinding the film, by using an index which rotates integrally with the supply spool of the thrust-type cartridge and one of indication marks provided on the cartridge case for indicating unexposed, partially-exposed, completely-exposed and developed states of the film. In other words, the indication of the usage state of the film is set by adjusting the position of the index to that of an applicable indication mark.

However, the camera of this kind has presented the following problem. If the user attempts to forcibly take out the cartridge by opening the cover of the cartridge chamber while the film is in a state of being pulled out of the cartridge, there is a possibility that the film is not only exposed to light but also is broken or left inside of the camera body in a broken state. In the event of such an accident, the camera must be sent for a repair as the film cannot be easily taken out from the camera by the user.

Further, in the case of the camera arranged to be capable of setting an indication showing the usage state of the film, if the cartridge is taken out by opening the cover of the cartridge chamber before completion of the process of adjusting the index to the position of an applicable indication mark, it would become impossible to correctly position the index and, after that, the usage state of the cartridge would become undiscernible.

Further, if an actuator is used solely for operating a lock mechanism of the cartridge chamber cover, the use of the actuator increases the size and cost of the camera.

A device disclosed in Japanese Laid-Open Patent Application No. Hei 6-258699 (corresponding to U.S. Pat. No. 5,432,575) is arranged to lock and unlock the cover of a cartridge chamber by using a part of a stowage area provided in a camera body for stowing a photo-taking lens barrel. According to such an arrangement, however, the area provided for stowing the photo-taking lens barrel becomes smaller. The small stowage area tends to overload a driving action on the photo-taking lens barrel or, if the photo-taking lens barrel is in a drawn-out state while the camera is not loaded with the cartridge, the photo-taking lens barrel must be drawn inward into the stowage area before loading the cartridge into the camera, because loading the cartridge in that state is impossible. Therefore, the operability of the camera has been greatly degraded by such a small stowage area.

BRIEF SUMMARY OF THE INVENTION

It is a first object of the invention to provide a cartridge chamber cover locking device, or a camera, having two lock means arranged to be capable of reliably preventing the cover of a cartridge chamber from opening while the film of a cartridge is in a state of being pulled out of the cartridge or from being inadvertently opened before the position of an index provided on the cartridge is set at a correct position.

It is a second object of the invention to provide a cartridge chamber cover locking device arranged to permit reduction in cost by obviating the necessity of having a drive source solely for unlocking the cover of a cartridge chamber.

It is a third object of the invention to provide a cartridge chamber cover locking device arranged to be capable of preventing a film from being damaged by an inadvertent opening operation on the cover of a cartridge chamber while the film is in a state of being pulled out of a cartridge.

It is a fourth object of the invention to provide a cartridge chamber cover locking device arranged to obviate the necessity of doing a troublesome operation of unlocking the cover of a cartridge chamber every time a cartridge is to be loaded in the cartridge chamber.

It is a fifth object of the invention to provide a cartridge chamber cover locking device arranged to prevent an increase in size of a camera by effectively utilizing a dead space existing within the camera.

To attain the above objects, in accordance with an aspect of the invention, there is provided a cartridge chamber cover locking device, comprising an operation member for opening a cover of a film cartridge chamber, a first lock member arranged to take, when the cover is in a closed state, one of a locking state of locking the cover against an opening operation performed on the operation member and an unlocking state of unlocking the cover, film transport means for transporting a film, wherein the first lock member takes one of the locking state and the unlocking state in association with a film transporting action of the film transport means, a second lock member arranged to take, when the cover is in a closed state, one of a locking state of locking the cover against an opening operation performed on the operation member and an unlocking state of unlocking the cover, and a lens barrel arranged to be movable forward or backward along an optical axis and to hold an objective lens, wherein the second lock member takes one of the locking state and the unlocking state in association with the movement of the lens barrel along the optical axis.

In the cartridge chamber cover locking device, in particular, the first lock member takes the locking state in association with a film feeding action of the film transport means.

Further, in the cartridge chamber cover locking device, the first lock member takes the unlocking state in association with a film rewinding action of the film transport means.

Further, in the cartridge chamber cover locking device, the second lock member takes the locking state in association with the lens barrel being drawn out forward, and takes the unlocking state in association with the lens barrel coming into a stowed state.

In accordance with another aspect of the invention, there is provided a cartridge chamber cover locking device, comprising an operation member for opening a cover of a film cartridge chamber, a lock member arranged to take, when the cover is in a closed state, one of a locking state of locking the cover against an opening operation performed on the operation member and an unlocking state of unlocking the cover, and a lens barrel arranged to be movable forward and backward along an optical axis and to hold an objective lens, wherein, if a film cartridge is loaded in the film cartridge chamber, the lock member takes one of the locking state and the unlocking state in association with the movement of the lens barrel, and, if no film cartridge is loaded in the film cartridge chamber, the lock member is kept into the unlocking state.

Further, in the cartridge chamber cover locking device, if a film cartridge is loaded in the film cartridge chamber, the lock member takes the locking state when the lens barrel is located in a forward position, and takes the unlocking state when the lens barrel is located in a backward position.

In accordance with a further aspect of the invention, there is provided a cartridge chamber cover locking device, comprising an operation member for opening a cover of a film cartridge chamber, a lock member arranged to take, when the cover is in a closed state, one of a locking state of locking the cover against an opening operation performed on the operation member and an unlocking state of unlocking the cover, film transport means for transporting a film, wherein the lock member takes the locking state in association with a film transporting action of the film transport means, and a lens barrel arranged to be movable forward or backward along an optical axis and to hold an objective lens, wherein the lock member takes the unlocking state in association with the movement of the lens barrel along the optical axis.

In the cartridge chamber cover locking device, in particular, the lock member changes from the locking state to the unlocking state in association with the backward movement of the lens barrel.

These and further objects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 16(a) and 16(b) show a lock mechanism according to a third embodiment of the invention.

DETAILED DESCRIPTION OF THE INVENTION

Hereinafter, preferred embodiments of the invention will be described in detail with reference to the drawings.

First Embodiment

FIGS. 1(a) to 1(d) show the arrangement of an opening-and-closing mechanism for the cover of a cartridge chamber of a camera according to a first embodiment of the invention.

Figure 1A:
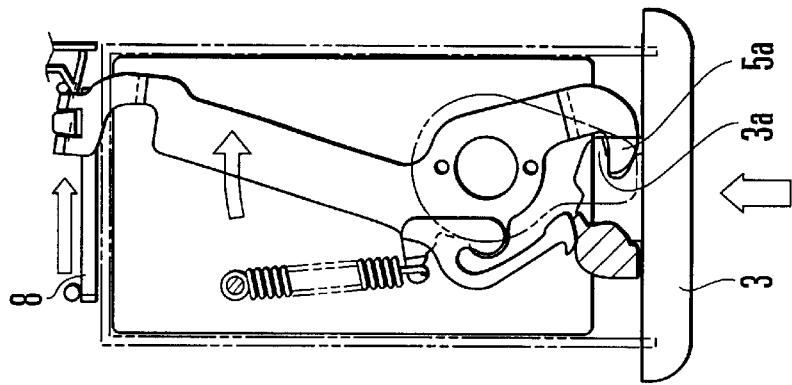
FIGS. 1(a) to 1(d) show the arrangement of a cartridge chamber cover opening-and-closing mechanism according to a first embodiment of the invention.
Figure 1B:
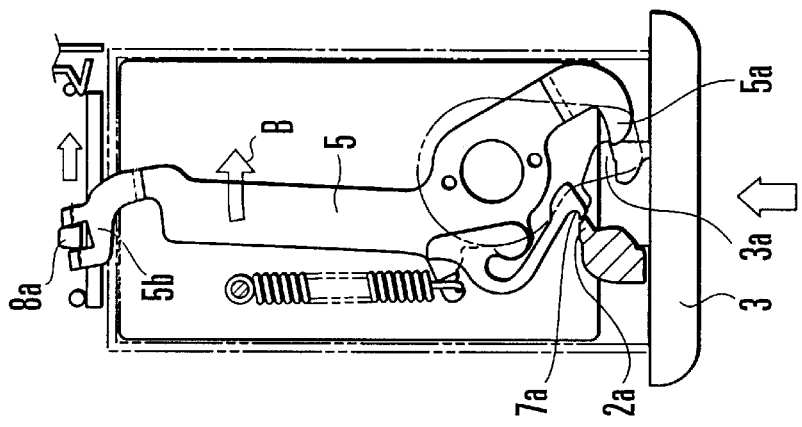
Figure 1C:
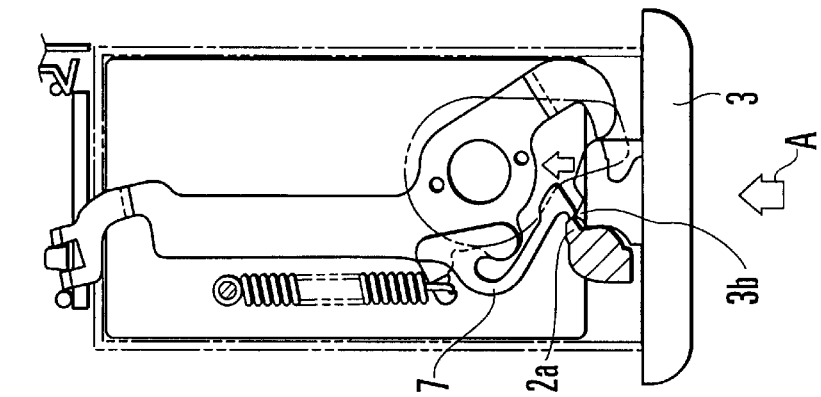
Figure 1D:
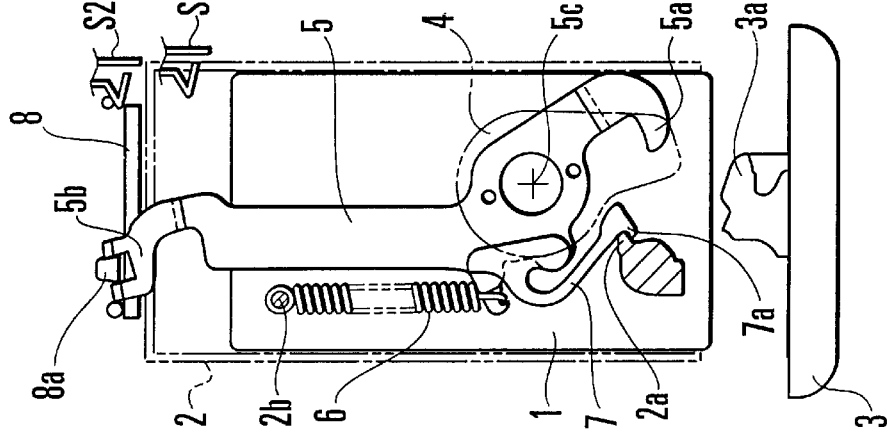

In FIG. 1(a), the cover of the cartridge chamber is shown in an open state. In FIG. 1(b), the cover of the cartridge chamber is shown in a first state obtained in closing the cover. In FIG. 1(c), the cover of the cartridge chamber is shown in a second state obtained in closing the cover. In FIG. 1(d), the cover of the cartridge chamber is shown in a completely closed state.

Figure 3A:
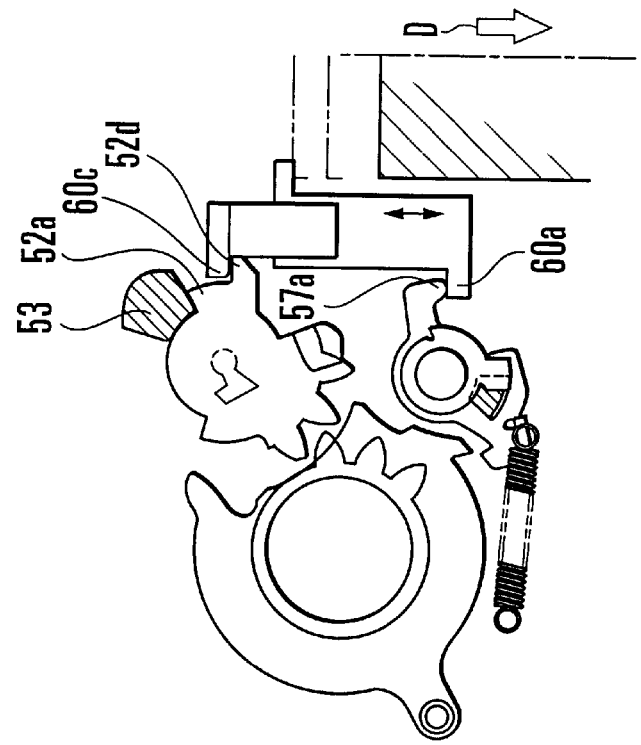
FIGS. 3(a) and 3(b) show a lock mechanism according to the first embodiment.
Figure 3B:
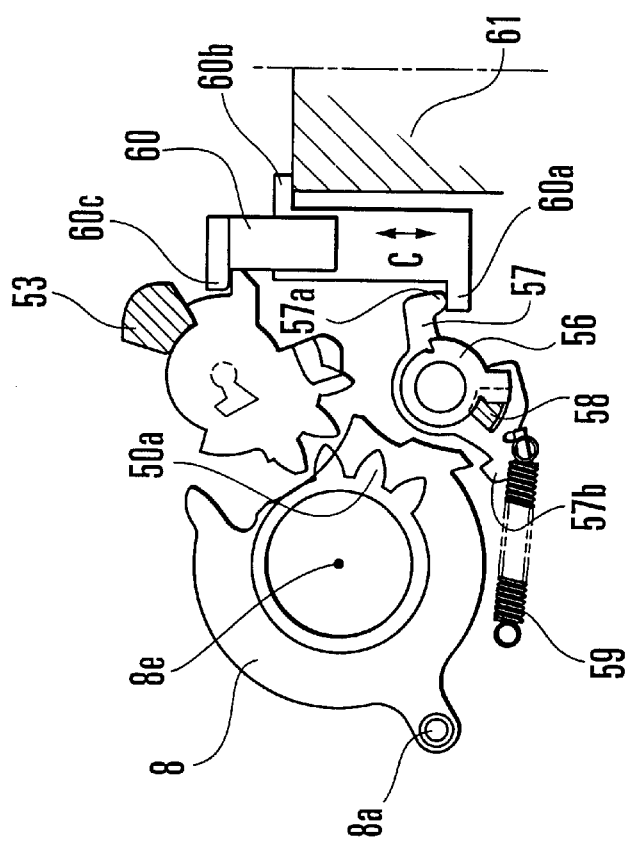

In FIGS. 1(a) to 1(d), there are illustrated a film cartridge 1, the cartridge chamber 2 having a film cartridge 1 housed therein, the cartridge chamber cover 3 which is arranged to open and close the cartridge chamber 2, an opening-and-closing knob 4 for opening the cartridge chamber cover 3, and an opening-and-closing lever 5 which is arranged to swing in association with the movement of the opening-and-closing knob 4. The opening-and-closing lever 5 is provided with a claw part 5a and a groove part 5b. An opening-and-closing lever spring 6 is arranged to urge the opening-and-closing lever 5 to swing clockwise. An open-state holding spring 7 which is made of an elastic material is held on the opening-and-closing lever 5 integrally therewith. A rotary lever 8, which is shown in detail in FIGS. 3(a) and 3(b), is arranged on the upper outside of the cartridge chamber 2. A detection switch S1 is arranged to detect the presence or absence of the film cartridge 2. Another detection switch S2 is arranged to detect the closed state of the cartridge chamber cover 3.

Referring to FIG. 1(a), which shows the cartridge chamber cover 3 in its open state, the cartridge chamber cover 3 is at a lowered position. In this state, the claw part 7a of the open-state holding spring 7 which is held on the opening-and-closing lever 5 integrally therewith is hooked on a claw part 2a which is formed at a part of the cartridge chamber 2. The opening-and-closing lever 5 is swingable on a shaft 5c by the opening-and-closing lever spring 6 arranged between the opening-and-closing lever 5 and a protruding part 2b which is formed at a part of the cartridge chamber 2. In the state of FIG. 1(a), however, the opening-and-closing lever 5 is kept at its position shown in FIG. 1(a) by the action of the claw part 7a.

In the state of FIG. 1(b), the cartridge chamber cover 3 is being moved in the direction of an arrow A, i.e., in the direction of closing. When the cartridge chamber cover 3 moves in the direction of closing, a claw part 3b of the cartridge chamber cover 3 pushes the open-state holding spring 7 upward. Then, the claw part 7a, which has been hooked on the claw part 2a, begins to part from the claw part 2a. FIG. 1(c) shows a state obtained when the cartridge chamber cover 3 has further moved in the closing direction. With the cartridge chamber cover 3 further moved in the closing direction, the claw part 7a disengages from the claw part 2a, and a claw part 3a of the cartridge chamber cover 3 comes to engage a claw part 5a of the opening-and-closing lever 5. At this time, the opening-and-closing lever 5 begins to gradually swing clockwise, i.e., in the direction or an arrow B shown in FIG. 1(c). Then, the rotary lever 8, which has its protruding part 8a engaging the groove part 5b of the opening-and-closing lever 5, also begins to rotate accordingly as the opening-and-closing lever 5 swings.

In the state of FIG. 1(d), the cartridge chamber cover 3 is in a completely closed state. In this state, the claw part 3a of the cartridge chamber cover 3 and the claw part 5a of the opening-and-closing lever 5 completely engage each other, and the rotary lever 8 has rotated in association with the swing of the opening-and-closing lever 5 to reach a closing position thereof.

Figure 2A:
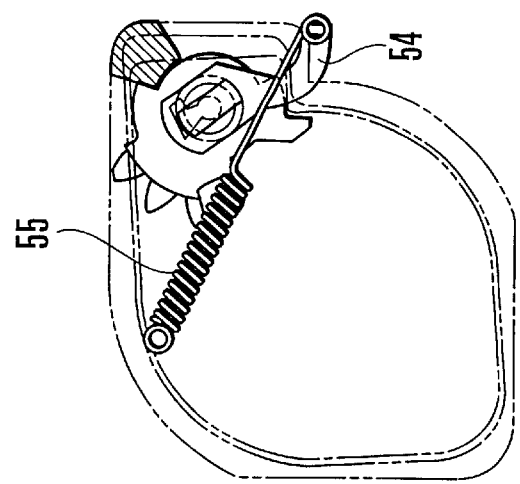
FIGS. 2(a) to 2(c) show the arrangement of a toggle mechanism provided at a cartridge chamber in the first embodiment.
Figure 2B:
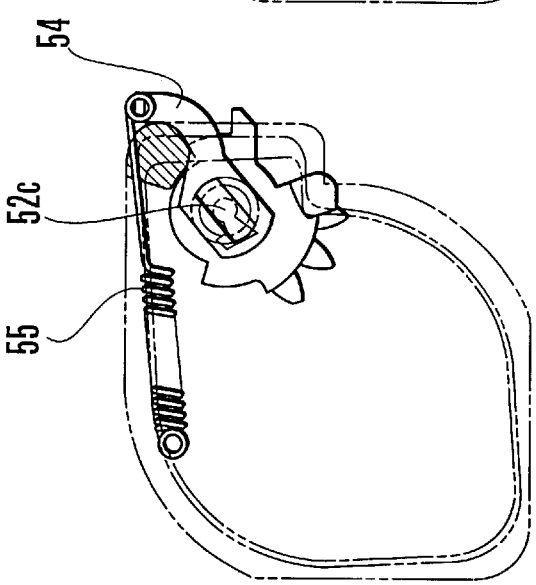
Figure 2C:
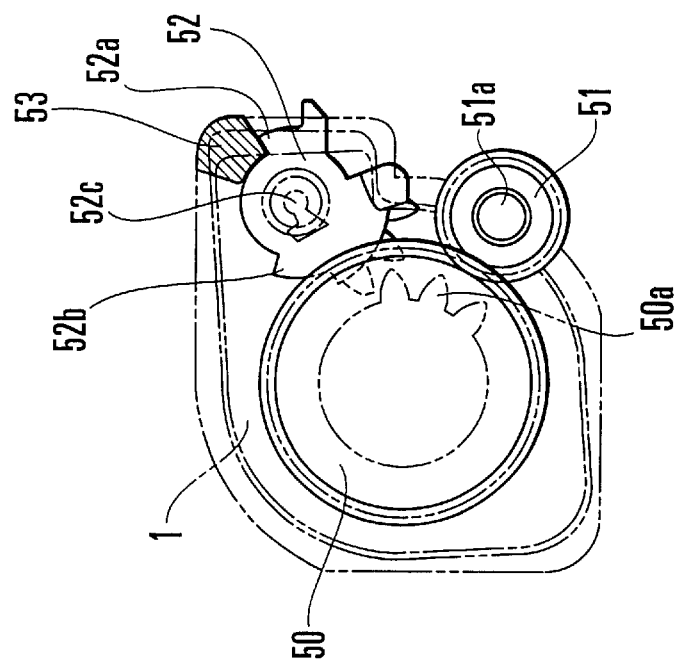

FIGS. 2(a) to 2(c) are partly-sectional top views showing the cartridge chamber 2 shown in FIGS. 1(a) to 1(d).

Referring to FIG. 2(a), there are illustrated the cartridge 1, a fork gear 50 which has a fork (not shown) at its center of rotation and is arranged to thrust-feed and rewind the film, and an idler gear 51 which is arranged to transmit a driving force of a film transport motor (not shown) to the fork gear 50 for transporting the film. The idler gear 51 rotates on a shaft 51a. The fork gear 50 is arranged to rotate clockwise in thrust-feeding (winding up) the film and to rotate counterclockwise in rewinding the film.

Further, the fork gear 50 is provided with a gear 50a which is formed at a different height to have three teeth.

A door opening-and-closing lever 52 is provided for opening and closing a light-blocking door of the cartridge 1 before the film is pulled out from the cartridge 1. The door opening-and-closing lever 52 is arranged to directly open and close the light-blocking door of the cartridge 1 by coming into a light-blocking door opening-and-closing part (not shown) of the cartridge 1 and rotating on its shaft 52c. The door opening-and-closing lever 52 is provided with rotation restricting parts 52a and 52b which are arranged to restrict the degree of rotation of the door opening-and-closing lever 52 by abutting on a stopper 53.

Referring next to FIGS. 2(b) and 2(c), a crank lever 54 is mounted on the upper part of the door opening-and-closing lever 52. A crank spring 55 is attached to the crank lever 54. The crank lever 54 is arranged to rotate integrally with the door opening-and-closing lever.52. Therefore, the degree of rotation of the crank lever 54 is restricted in the same manner as the rotation of the door opening-and-closing lever 52.

Since the crank spring 55 is a tension spring, the rotation of the crank lever 54 is in an unstable state when the crank spring 55 passes the shaft 52c, i.e., the center of rotation, and in a stable state when the crank lever 54 reaches either of both ends at which the rotation of the crank lever 54 is restricted. The door opening-and-closing lever 52 is thus arranged to have a so-called toggle structure. The stable states obtained at the both ends of the rotation of the door opening-and-closing lever 52 are shown, respectively, in FIGS. 2(b) and 2(c).

A lock mechanism for locking the cartridge chamber cover 3 is next described with reference to FIGS. 3(a) and 3(b).

In FIGS. 3(a) and 3(b), reference numeral 8 denotes the rotary lever shown in FIG. 1(a). The rotary lever 8 is coaxial with the fork gear 50 and rotates on a shaft 8e. In the state shown in FIG. 3(a), the rotary lever 8 is at a position where the cartridge chamber cover 3 is closed. A lock lever (A) 56 is disposed to be coaxial with the idler gear 51 shown in FIG. 2(a) and is kept in frictional contact with the idler gear 51. When the idler gear 51 rotates on its shaft 51a, the lock lever (A) 56 rotates in the same direction as the idler gear 51. However, the rotation of the lock lever (A) 56 is restricted by a stopper 58. When the fork gear 50 rotates in the film rewinding direction (counterclockwise), the idler gear 51 rotates clockwise to cause the lock lever (A) 56 to rotate until the lock lever (A) 56 comes to a stop at the stopper 58, as shown in FIG. 3 (a). After completion of photo-taking, since the film rewinding action is carried out, the lock lever (A) 56 is stopped after the clockwise rotation.

A lock lever (B) 57 is disposed to be coaxial with the idler gear 51 to rotate also on the shaft 5la shown in FIG. 2 (a). A tension spring 59 is arranged to urge the lock lever (B) 57 to rotate clockwise. A slide lever 60 has three protruding parts 60a, 60b and 60c and is arranged to be movable forward and backward in the direction of an arrow C, i.e., along the optical axis. A photo-taking lens barrel 61 is also arranged to be movable in the direction of the arrow C. In the state shown in FIG. 3(a), the photo-taking lens barrel 61 is at a stowed position. In other words, FIG. 3(a) shows a state in which the cartridge 1 has not been loaded and the photo-taking lens barrel 61 is at the stowed position.

When the photo-taking lens barrel 61 is stowed, the slide lever 60 has its protruding part 60b pushed by the photo-taking lens barrel 61 and is thus pushed down to its stowed position. At this time, the protruding part 60a of the slide lever 60 pushes the protruding part 57a of the lock lever (B) 57. Therefore, a claw part 57b of the lock lever (B) 57 is kept at an unlocking position against the urging force of the tension spring 59. As mentioned with reference to FIGS. 1(a) to 1(d) above, the cartridge chamber cover 3 can be opened and closed so long as the rotation of the rotary lever 8 is not brought to a stop.

FIG. 3(b) shows a state in which the cartridge 1 has not been loaded and the photo-taking lens barrel 61 is at a drawn-out position. The photo-taking lens barrel 61 is arranged to be movable along the optical axis by means of a motor (not shown).

In the state of FIG. 3(b), the photo-taking lens barrel 61 has been drawn out (in the direction of an arrow D) to a photo-taking area. However, in this state, the rotation of the door opening-and-closing lever 52 is restricted through its rotation restricting part 52a by the toggle mechanism described above with reference to FIGS. 2(b) and 2(c). The protruding part 60c of the slide lever 60 is held by the protruding part 52d of the door opening-and-closing lever 52. Then, as in the state of FIG. 3(a), the claw part 57b of the lock lever (B) 57 is kept at its unlocking position against the urging force of the tension spring 59. Therefore, with the cartridge 1 not loaded, the cartridge chamber cover 3 always can be opened or closed irrespectively of the position of the photo-taking lens barrel 61.

A loading operation for loading the cartridge 1 into the cartridge chamber 2 is next described with reference to FIGS. 4(a) to 4(d).

Figure 4B:
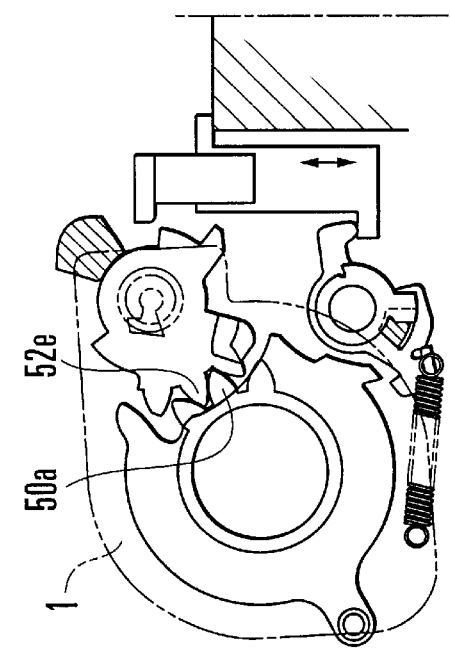
FIGS. 4(a) to 4(d) show a series of cartridge loading actions performed in the first embodiment.
Figure 4A:
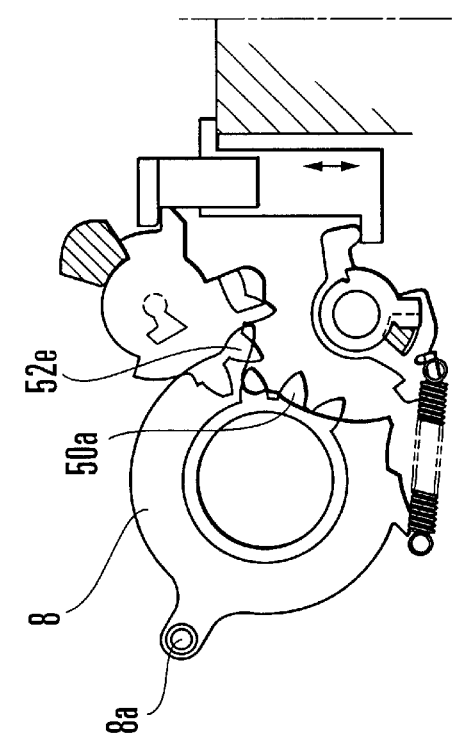

FIG. 4(a) shows a state obtained with the cartridge chamber cover 3 opened by turning the opening-and-closing knob 4 shown in FIG. 1(a) counterclockwise. The state of FIG. 4(a) thus corresponds to that of FIG. 1(a). The rotary lever 8 is then at the unlocking position, so that the cartridge chamber cover 3 can be easily opened.

Next, when the cartridge I is loaded into the cartridge chamber 2, a series of actions is performed as shown in FIGS. 1(a), 1(b) and 1(c). As a result, the rotary lever 8 takes its position shown in FIG. 1(a) When the presence of the cartridge 1 is detected by the switch S1 and the cartridge chamber cover 3 is closed, the switch S2 outputs a signal indicative of the closing of the cartridge chamber cover 3. After that, the fork gear 50 first begins to rotate in the direction of film rewinding, i.e., counterclockwise as viewed in FIG. 4(a). Then, the gear 50a which is formed integrally with the fork gear 50 comes to mesh with the gear part 52e of the door opening-and-closing lever 52. The door opening-and-closing lever 52 then begins to rotate according to the rotation of the fork gear 50. This state is shown in FIG. 4(b).

Figure 4D:
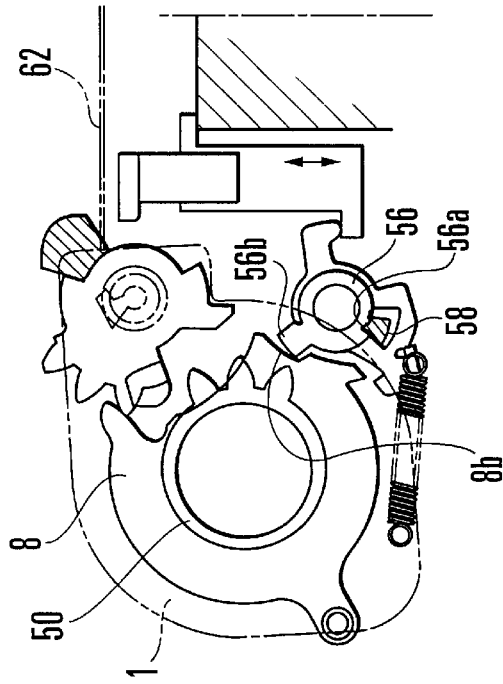
Figure 4C:
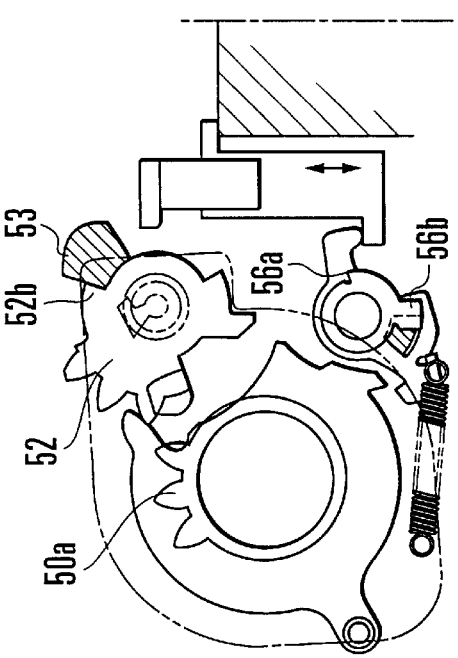

FIG. 4(c) shows a state obtained with the door of the cartridge 1 opened. The door opening-and-closing lever 52 has its part 52b abut on the stopper 53. The door opening-and-closing lever 52 is thus at a position where its rotation is brought to its end by the rotation of the fork gear 50. Next, referring to FIG. 4(d), when the fork gear 50 rotates clockwise (reverse rotation), the film 62 is pulled out from the cartridge 1 within the cartridge chamber 2. Then, with the fork gear 50 rotated clockwise, the idler gear 51 which is located before the fork gear 50 as shown in FIG. 2(a) comes to rotate counterclockwise to cause the lock lever (A) 56 which is kept in frictional contact with the idler gear 51 also to rotate counterclockwise. Then, the protruding part 56a of the lock lever (A) 56 comes to abut on the stopper 58 and then keeps on abutting thereon. With the cartridge 1 loaded, this state continues until immediately before the film 62 is rewound.

When the opening-and-closing knob 4 is turned in the direction of opening in the state of FIG. 4(d), the rotary lever 8 tries to rotate clockwise. However, the rotation of the rotary lever 8 attempted is prevented as the protruding part 8b of the rotary lever 8 comes to abut on the protruding part 56b of the lock lever (A) 56. Therefore, the opening-and-closing knob 4 cannot be turned around to open the cartridge chamber cover 3, because the clockwise rotation of the rotary lever 8 is prevented.

Figure 5:
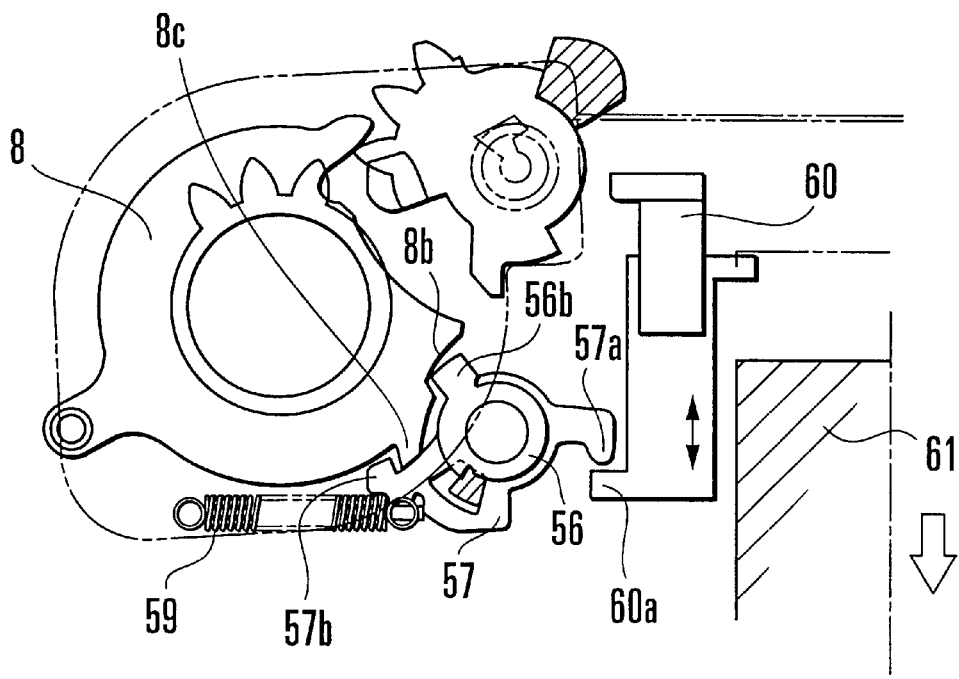
FIG. 5 shows the lock mechanism according to the first embodiment.

FIG. 5 shows a state obtained in winding the film 62. In this state, the main switch (not shown) of the camera is turned on and the photo-taking lens barrel 61 is drawn out.

With the photo-taking lens barrel 61 drawn out, the slide lever 60 becomes free. The protruding part 57a of the lock lever (B) 57 which is urged to rotate by the tension spring 59 also becomes free. The lock lever (B) 57 rotates clockwise to come to the position shown in FIG. 5. The clockwise rotation of the lock lever (B) 57 causes its claw part 57b to be hooked on the claw part 8c of the rotary lever 8. In this state, the rotary lever 8 cannot rotate clockwise. Under such a condition, the opening-and-closing knob 4 cannot be turned, so that the cartridge chamber cover 3 cannot be opened. In other words, in the state of FIG. 5, two lock parts, i.e., one lock part effected by the protruding parts 8b and 56c and another lock part effected by the claw parts 8c and 57b, are acting.

Figure 6:
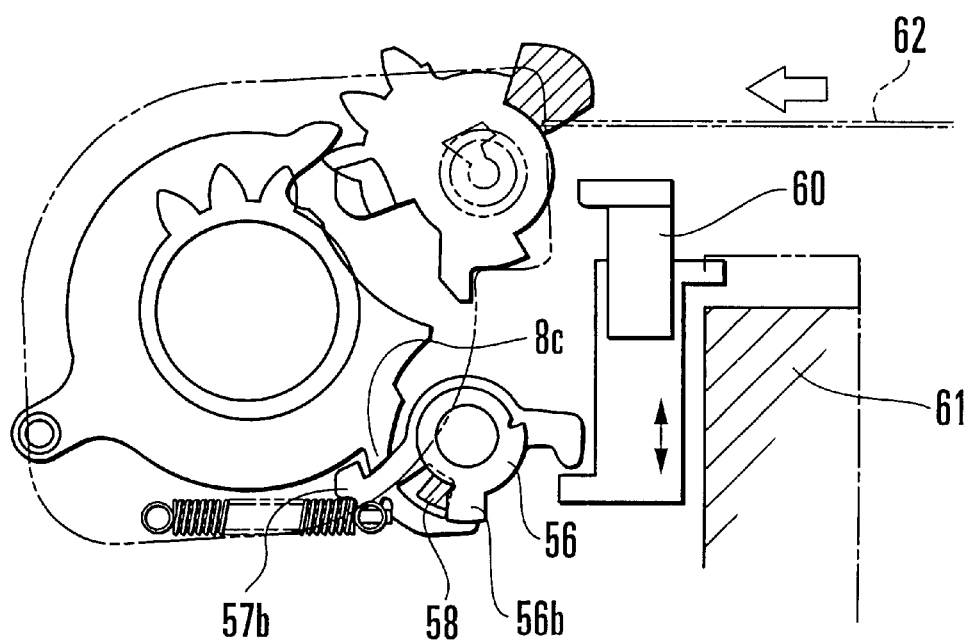
FIG. 6 shows also the lock mechanism according to the first embodiment.

FIG. 6 shows a state obtained while the film 62 is in process of being rewound. When the film 62 comes to be rewound, the photo-taking lens barrel 61 is forcibly brought to a standby state at a wide-angle end position. The lock lever (A) 56 then rotates clockwise. The protruding part 56b comes to abut on the stopper 58 to prevent further clockwise rotation of the lock lever (A) 56. Therefore, the lock effected by the lock lever (A) 56 is canceled. In the meantime, the other lock lever (B) 57 remains in its state of having the claw part 57b in the hooked engagement with the claw part 8c of the rotary lever 8 in the same manner as in the state of FIG. 5. The cartridge chamber cover 3, therefore, cannot be opened as it is impossible to turn the opening-and-closing knob 4 in this state.

Figure 7:
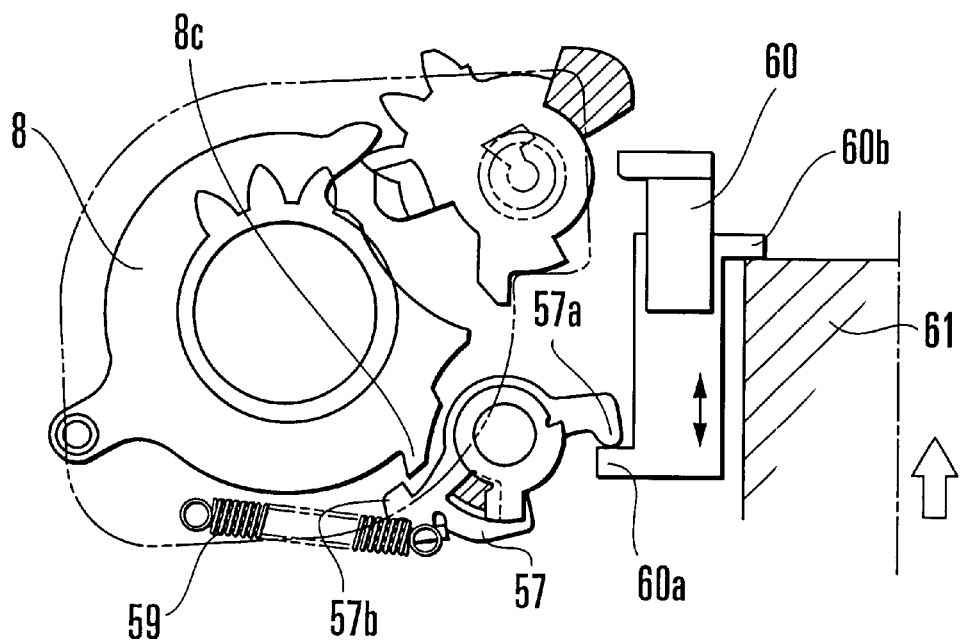
FIG. 7 shows also the lock mechanism according to the first embodiment.

FIG. 7 shows a state obtained immediately after completion of film rewinding. In this state, the photo-taking lens barrel 61 is at its stowed position. The slide lever 60 has its protruding part 60b pushed by the photo-taking lens barrel 61. Another protruding part 60a of the slide lever 60 pushes the protruding part 57a of the lock lever (B) 57 to cause the lock lever (B) 57 to rotate counterclockwise against the urging force of the tension spring 59. The counterclockwise rotation of the lock lever (B) 57 disengages the claw part 8c of the rotary lever 8 from the claw part 57b to render the rotary lever 8 rotatable. In this state, therefore, the rotary lever 8 can be rotated by turning the opening-and-closing knob 4.

Figure 8:
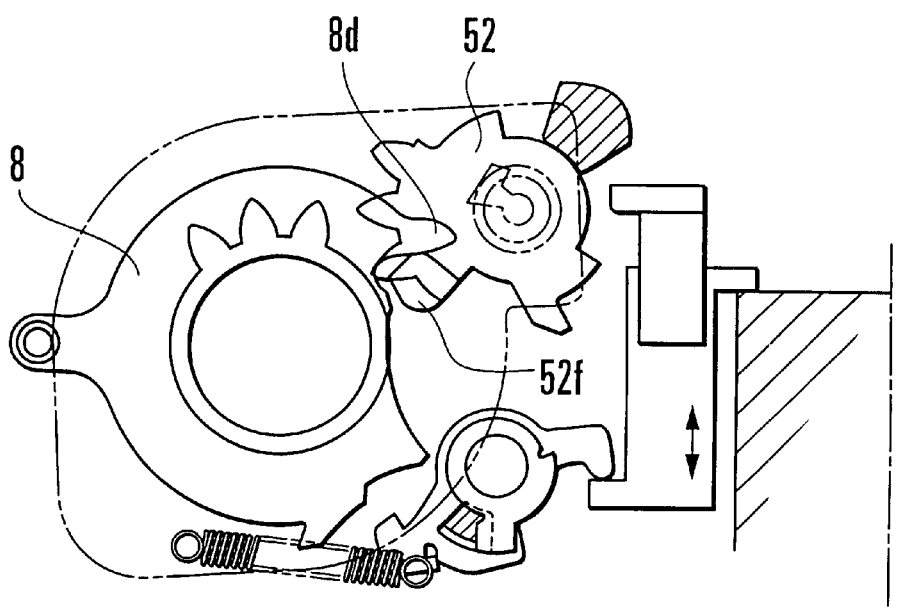
FIG. 8 shows also the lock mechanism according to the first embodiment.

FIG. 8 shows a state obtained while the opening-and-closing knob 4 is in process of being turned. With the opening-and-closing knob 4 thus turned, the opening-and-closing lever 5 which is shown in FIGS. 1(a) to 1(d) swings to cause the rotary lever 8 to rotate. By this rotation, the claw part 8d of the rotary lever 8 is caused to push the protruding part 52f of the door opening-and-closing lever 52. The door opening-and-closing lever 52 then rotates counterclockwise accordingly as the rotary lever 8 rotates clockwise. When the door opening-and-closing lever 52 rotates halfway, the rotation of the door opening-and-closing lever 52 is advanced by the above-stated toggle mechanism. Then, the rotation of the rotary lever 8 comes to follow that of the door opening-and-closing lever 52. This action is performed in such a way as to open the cartridge chamber cover 3 after the door of the cartridge 1 is closed. Then, the state of the device comes back to the state shown in FIG. 4(a).

Figure 9A:
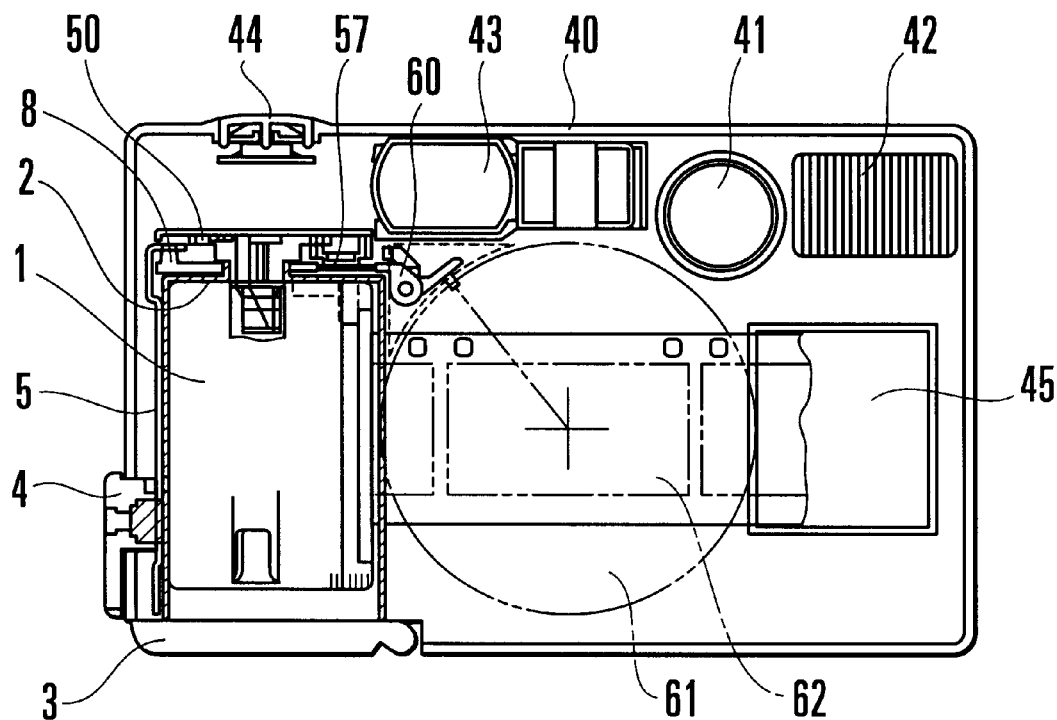
FIG. 9(a) is a partly-sectional front view showing a camera according to the first embodiment of the invention.
Figure 9B:
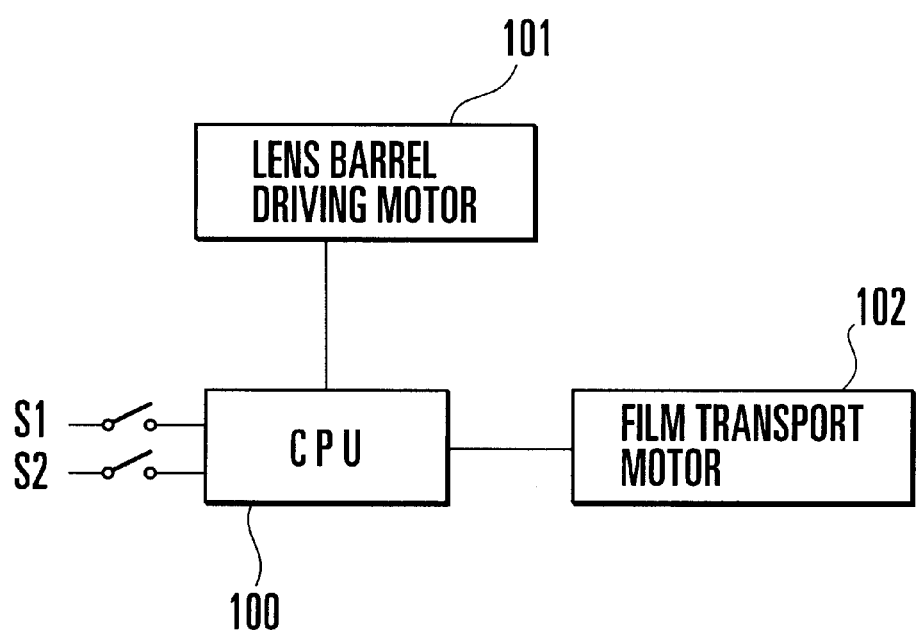
FIG. 9(b) is a block diagram showing a control system of the camera.

FIG. 9(a) is a front view of the camera having the lock mechanism described above. FIG. 9(b) shows in a block diagram a control system of the camera.

In FIG. 9(a), there are illustrated an exterior part 40, a viewfinder 41, a flash light emitting part 42, a distance measuring device 43 arranged to measure a distance to an object of shooting, a release button 44, and a spool chamber 45. The spool chamber 45 is arranged to house therein the film 62 pulled out from the cartridge 1 which is set within the cartridge chamber 2. As shown FIG. 9(a), the slide lever 60 which is a part of the lock switching mechanism for switching the state of the cartridge chamber cover 3 between an unlocked state and a locked state is disposed in a space available between the photo-taking lens barrel 61 and the cartridge chamber 2.

Referring to FIG. 9(b), a central processing unit (CPU) 100 is connected to a photo-taking-lens barrel driving motor 101 and a film transport motor 102 and is thus arranged to control these motors 101 and 102. The CPU 100 is connected also to the detection switch S1 arranged to detect the presence or absence of the film cartridge and the detection switch S2 arranged to detect closing of the cartridge chamber cover 3 (see FIG. 1(a)).

The CPU 100 operates as follows. When the detection switch S1 detects that the camera is loaded with the film and the detection switch S2 detects that the cartridge chamber cover 3 is closed, the CPU 100 causes the film transport motor 102 to be driven first in the direction of film rewinding. With the film transport motor 102 driven in this manner, the opening-and-closing lever 52 is caused to rotate to open the door of the film cartridge, as shown in FIG. 2(c). After the door of the cartridge is thus opened, the film transport motor 102 is caused to reversely rotate to feed the film. Then, after the lapse of a predetermined period of time, the CPU 100 prepares for a photo-taking operation by causing the lens barrel driving motor 101 to be driven in such a way as to have the photo-taking lens barrel 61 drawn out from its stowed position to its photo-taking position. Under this condition, the two lock parts act to lock the rotary lever 8 to prevent the rotary lever 8 from rotating, in the manner as mentioned above. After the opening-and-closing lever 52 is driven to rotate, the control by the CPU 100 may be performed either to control the film transport motor 102 after the drawing-out action on the photo-taking lens barrel 61 or to control the film transport motor 102 concurrently with the drawing-out action on the photo-taking lens barrel 61.

It goes without saying that, even with the closed state of the cartridge chamber cover 3 detected by the detection switch S2, if the switch S1 is not in its on-state, thus indicating that the camera is not loaded with the film, the film transport motor 102 is of course not driven. On the other hand, the photo-taking lens barrel 61 may be arranged to be drivable back and forth in the direction of its optical axis with the camera not loaded with any film. In this instance, with the camera loaded with no film, the rotary lever 8 is not locked to allow the cartridge chamber cover 3 to be opened even in a state of having the photo-taking lens barrel 61 drawn out, as shown in FIG. 3(b).

In taking out the film cartridge from the camera after completion of photo-taking, the CPU 100 causes the film transport motor 102 to be driven in the direction of film rewinding. After that, the CPU 100 controls the lens barrel driving motor 101 to bring the photo-taking lens barrel 61 into its stowed position. With the control performed in this manner, locking by the two lock parts is canceled to permit the film cartridge to be taken out.

Second Embodiment

Figure 10:
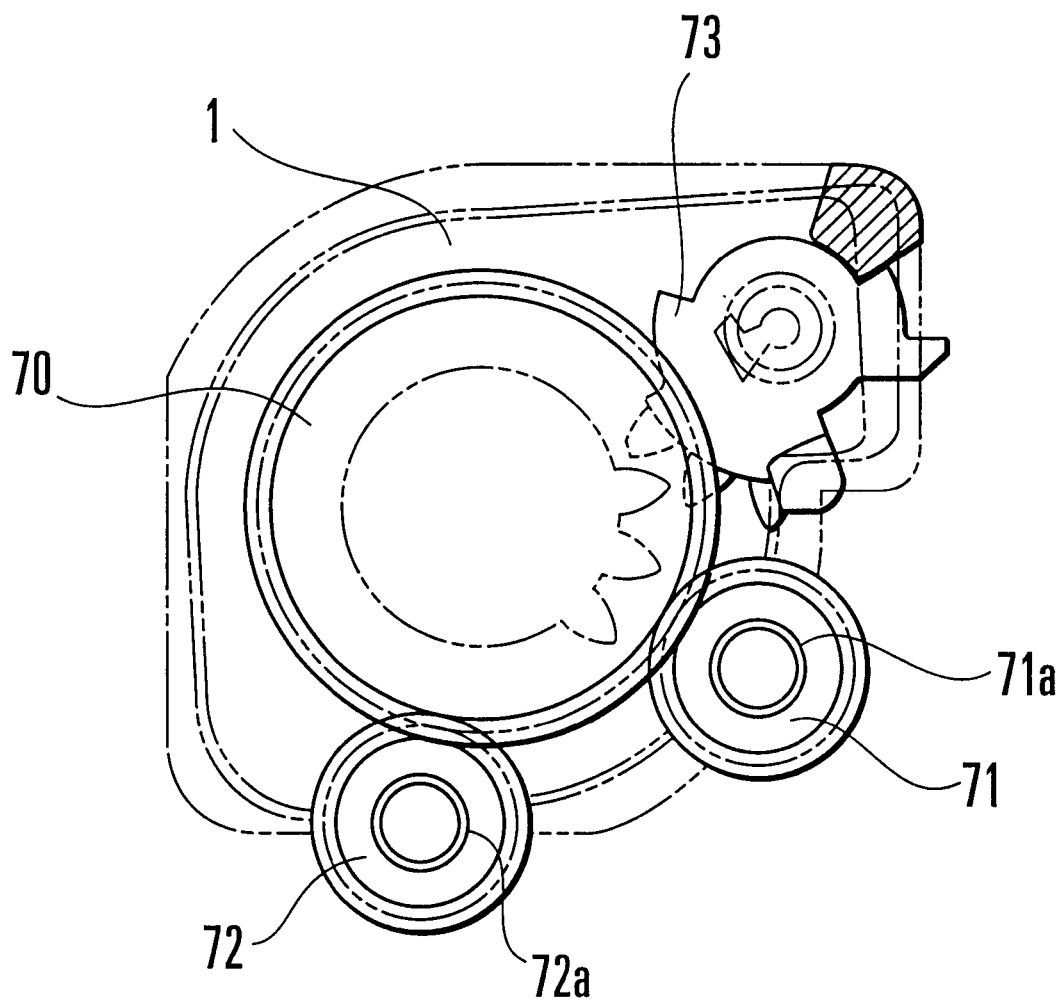
FIG. 10 shows a lock mechanism according to a second embodiment of the invention.

FIG. 10 is a partly sectional top view showing a cartridge chamber of a camera arranged according to a second embodiment of the invention. Referring to FIG. 10, a fork gear 70 is arranged to thrust-feed and rewind a film. An idler gear 71 is arranged to rotate on a shaft 71a in such a way as to transmit the driving force of a film transport motor (not shown) to the fork gear 70 for transporting the film. A gear (R) 72 is arranged to be in mesh with the fork gear 70 and to rotate on a shaft 72a. A door opening-and-closing lever 73 is provided for opening and closing the door of a film cartridge.

The fork gear 70, the idler gear 71 and the door opening-and-closing lever 73 are arranged in the same manner as in the first embodiment described above. As in the first embodiment, the door opening-and-closing lever 73 is also provided with a toggle mechanism although the details thereof are omitted from the following description.

Figure 11A:
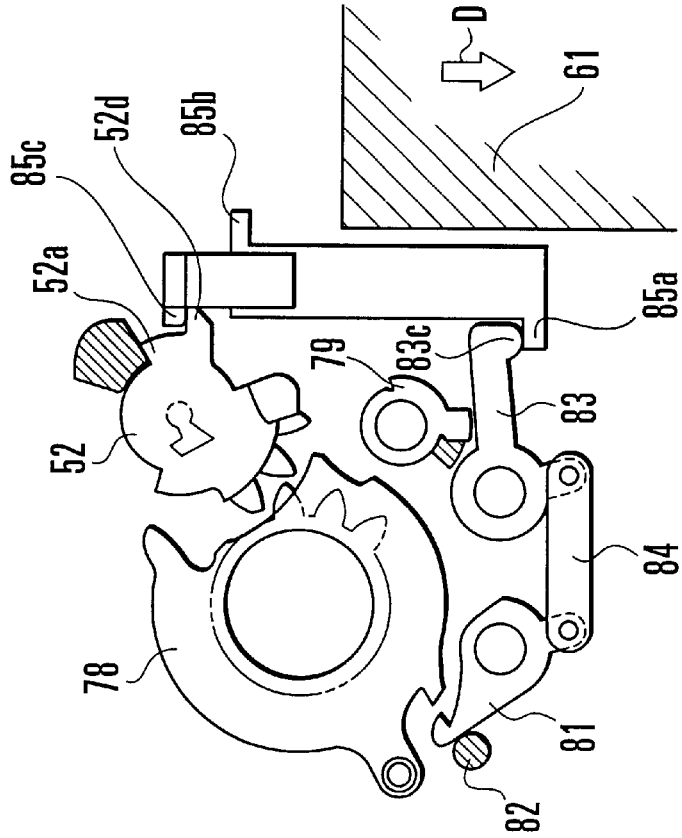
FIGS. 11(a) and 11(b) show also the lock mechanism according to the second embodiment.
Figure 11B:
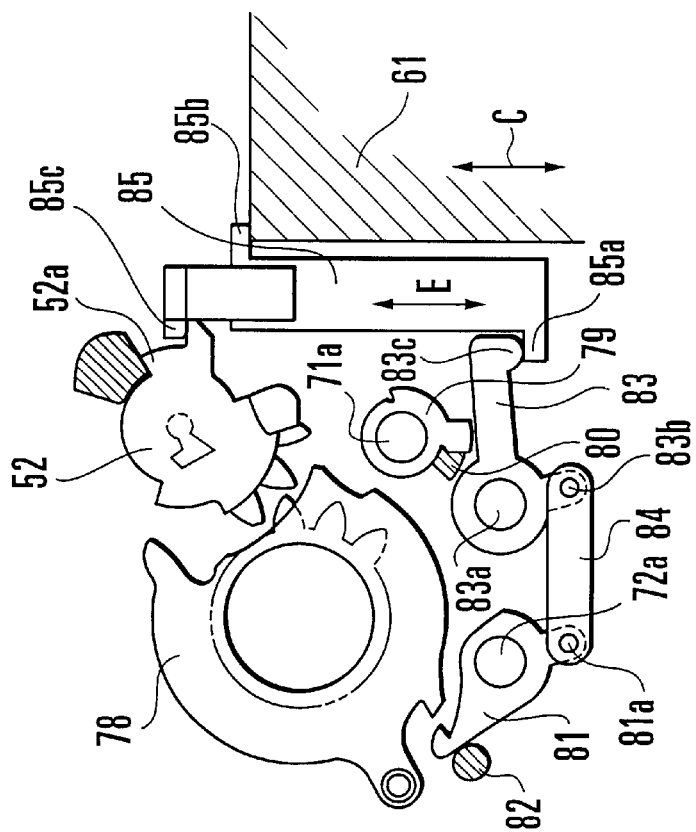

FIGS. 11(a) and 11(b) show the lock mechanism according to the second embodiment of the invention. Referring to FIGS. 11(a) and 11(b), a rotary lever 78 is coaxial with the fork gear 70. In the states shown in FIGS. 11(a) and 11(b), the cartridge chamber cover 3 is closed. A lock lever (A) 79 is disposed to be coaxial with the idler gear 71 shown in FIG. 10, and is kept in frictional contact with the idler gear 71.

When the idler gear 71 rotates on its shaft 71a, the lock lever (A) 79 rotates in the same direction as the rotation of the idler gear 71. However, the rotation of the lock lever (A) 79 is brought to a stop by a stopper 80. When the fork gear 70 rotates in the direction of film rewinding (counterclockwise), the idler gear 71 rotates clockwise and comes to a stop at the stopper 80.

A lock lever (B) 81 is coaxial with the gear (R) 72 shown in FIG. 10 and is arranged to rotate on the shaft 72a. The lock lever (B) 81 is kept in frictional contact with the gear (R) 72. When the gear (R) 72 rotates on the shaft 72a, the lock lever (B) 81 rotates in the same direction as the rotation of the gear (R) 72. The rotation of the lock lever (B) 81 is, however, restricted by a stopper 82. An interlocking lever (C) 83 is arranged to swing on a shaft 83a. A link lever 84 is rotatably carried by a support part 81a of the lock lever (B) 81 and a support part 83b of the interlocking lever (C) 83, so that the lock lever (B) 81 and the interlocking lever (C) 83 form a parallel link. The lock lever (B) 81 and the interlocking lever (C) 83 are thus arranged to rotate in the same direction.

FIG. 11(a) shows a state in which the camera is not loaded with the cartridge 1 and the photo-taking lens barrel 61 is at its stowed position (in an unlocked state). Since the use of a roll of film for photo-taking is completed by film rewinding, the lock lever (A) 79 has been brought to a stop by rotating the lock lever (A) 79 clockwise in the state shown in FIG. 11(a). A slide lever 85 is provided with three protruding parts 85a, 85b and 85c and is arranged to be movable in the direction of an arrow E. The photo-taking lens barrel 61 is arranged to be movable in the direction of an arrow C.

FIG. 11(b) shows a state in which the camera is not loaded with the cartridge 1 and the photo-taking lens barrel 61 is at a drawn-out position. With the photo-taking lens barrel 61 drawn out, the protruding part 85b of the slide lever 85 is no longer in contact with the photo-taking lens barrel 61. In this state, although the photo-taking lens barrel 61 has been drawn out to a photo-taking area (in the direction of an arrow D), the toggle mechanism which is arranged as described in the foregoing with reference to FIGS. 2(b) and 2(c) restricts the rotation of the door opening-and-closing lever 52 through the rotation restricting part 52a. The protruding part 85c of the slide lever 85 is held by the protruding part 52d of the door opening-and-closing lever 52. A protruding part 83c of the interlocking lever (C) 83 is restricted by the protruding part 85a of the slide lever 85. The lock lever (B) 81 is kept at its position shown in FIG. 11(b) by the above-stated link mechanism. When the camera is not loaded with the cartridge 1, therefore, the cartridge chamber cover 3 remains in a state in which the cartridge chamber cover 3 can be opened and closed irrespective of the position of the photo-taking lens barrel 61.

A loading operation for loading the cartridge 1 into the cartridge chamber 2 is next described with reference to FIGS. 12(a) to 12(d).

Figure 12:
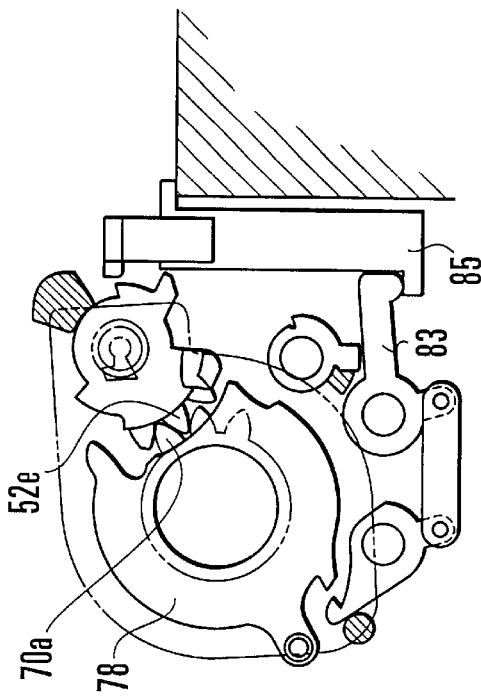
FIGS. 12(a) to 12(d) show also the lock mechanism according to the second embodiment.
Figure 12:
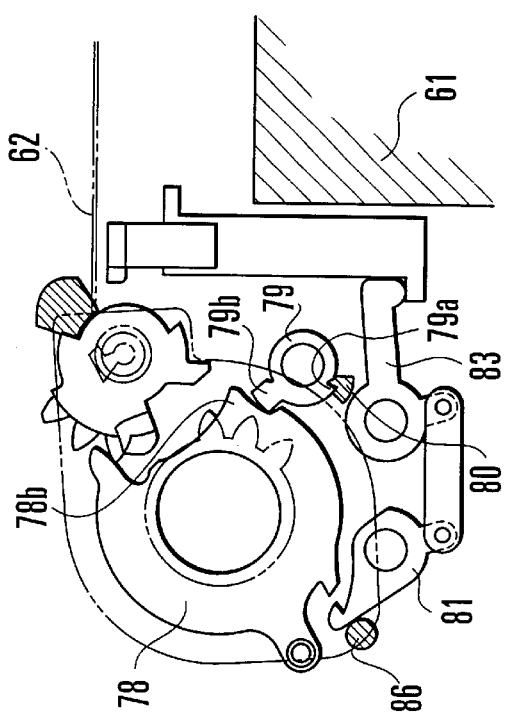
Figure 12:
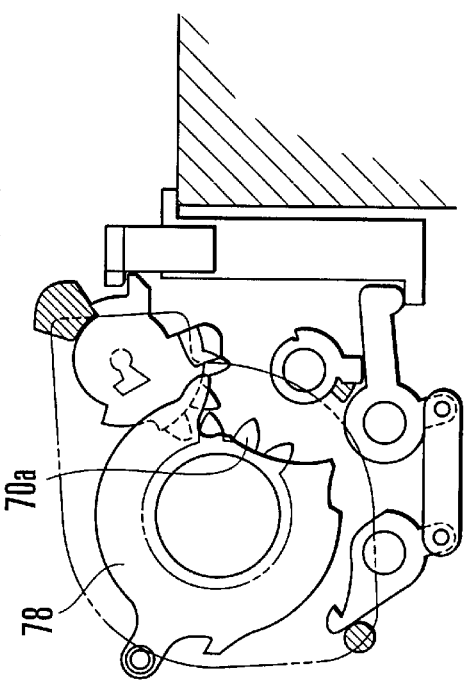
Figure 12:
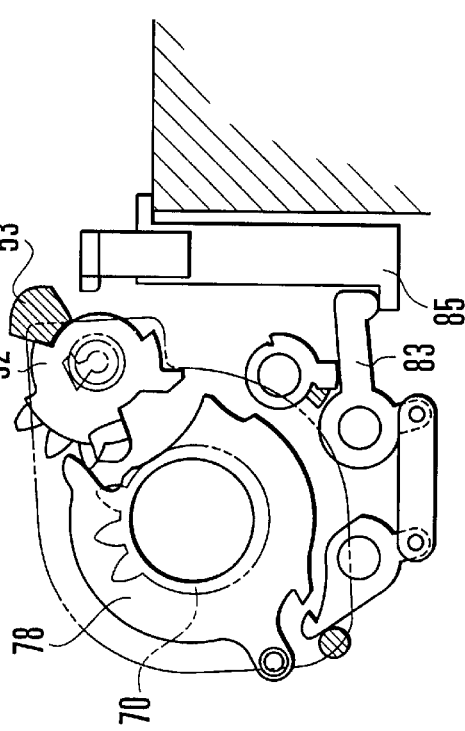

FIG. 12(a) shows a state obtained with the cartridge chamber cover 3 opened by turning the opening-and-closing knob 4 shown in FIG. 1(a) counterclockwise. The state of FIG. 12(a) thus corresponds to that of FIG. 1(a). Since the rotary lever 78 is at an unlocked position, the cartridge chamber cover 3 can be easily opened.

Next, when the cartridge 1 is loaded, a series of actions is performed as shown in FIGS. 1(a) to 1(d). As a result, the rotary lever 8 takes its position as shown in FIG. 1(d). When the cartridge chamber cover 3 is closed, a closing signal (not shown) is obtained. The fork gear 70 then beings to rotate in the direction of film rewinding (counterclockwise as viewed in FIG. 12(a)). At this time, the gear 70a which is held integrally with the fork gear 70 comes to mesh with the gear part 52e of the door opening-and-closing lever 52. The door opening-and-closing lever 52 also begins to rotate according to the rotation of the fork gear 70. This state is shown in FIG. 12(b).

FIG. 12(c) shows a state obtained with the door of the cartridge 1 opened. The door opening-and-closing lever 52 abuts on the stopper 53. The door opening-and-closing lever 52 is thus at a position where its rotation is brought to an end by the rotation of the fork gear 70. Next, referring to FIG. 12(d), when the fork gear 70 rotates clockwise (reverse rotation), the film 62 is pulled out from the cartridge 1 within the cartridge chamber 2. Then, with the fork gear 70 rotated clockwise, the idler gear 71 and the gear (R) 72 respectively come to rotate counterclockwise to cause the lock lever (A) 79 and the interlocking lever (C) 83 which are in frictional contact with the idler gear 71 also to rotate counterclockwise. Then, the protruding part 79a of the lock lever (A) 79 comes to abut on the stopper 80, and the lock lever (B) 81 comes to abut on the stopper 86, respectively to keep on abutting on these stoppers. With the cartridge 1 loaded, this state continues until immediately before the film 62 is completely rewound. When the opening-and-closing knob 4 is turned in the direction of opening in this state, the rotary lever 78 tries to rotate clockwise. However, the rotation of the rotary lever 78 attempted is prevented as the protruding part 78b of the rotary lever 78 comes to abut on the protruding part 79b of the lock lever (A) 79. Therefore, the opening-and-closing knob 4 cannot be turned to open the cartridge chamber cover 3, because the clockwise rotation of the rotary lever 78 is prevented. While the photo-taking lens barrel 61 is at a drawn-out position in the state of FIG. 12(d), the device can be kept in the same state with the photo-taking lens barrel 61 at the stowed position instead of the drawn-out position.

Next, a film rewinding state is described.

Figure 13:
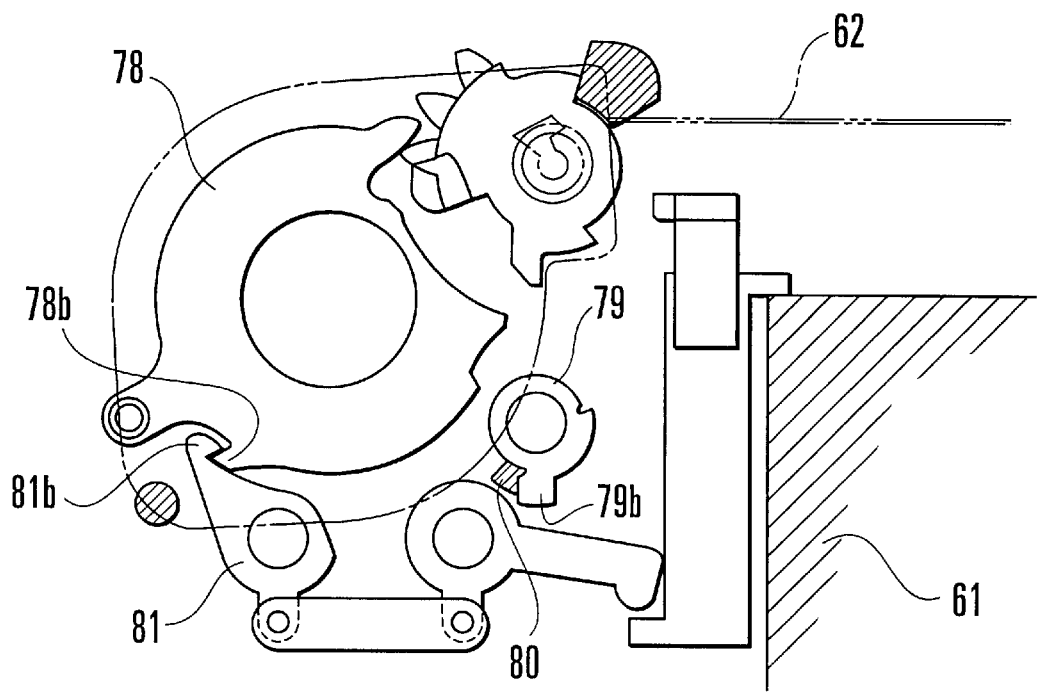
FIG. 13 shows also the lock mechanism according to the second embodiment.

FIG. 13 shows a state obtained while the film 62 is in process of rewinding. When the film 62 comes to be rewound, the photo-taking lens barrel 61 is forcibly brought to a standby state at a wide-angle end position. The lock lever (A) 79 rotates clockwise. The protruding part 79b comes to abut on the stopper 80 to prevent further clockwise rotation of the lock lever (A) 79.

Therefore, the lock effected by the lock lever (A) 79 is canceled. In the meantime, the other lock lever (B) 81 remains in its state of having the claw part 81b in the hooked engagement with the claw part 78b of the rotary lever 78. The cartridge chamber cover 3, therefore, cannot be opened as it is impossible to turn the opening-and-closing knob 4 in this state.

Figure 14:
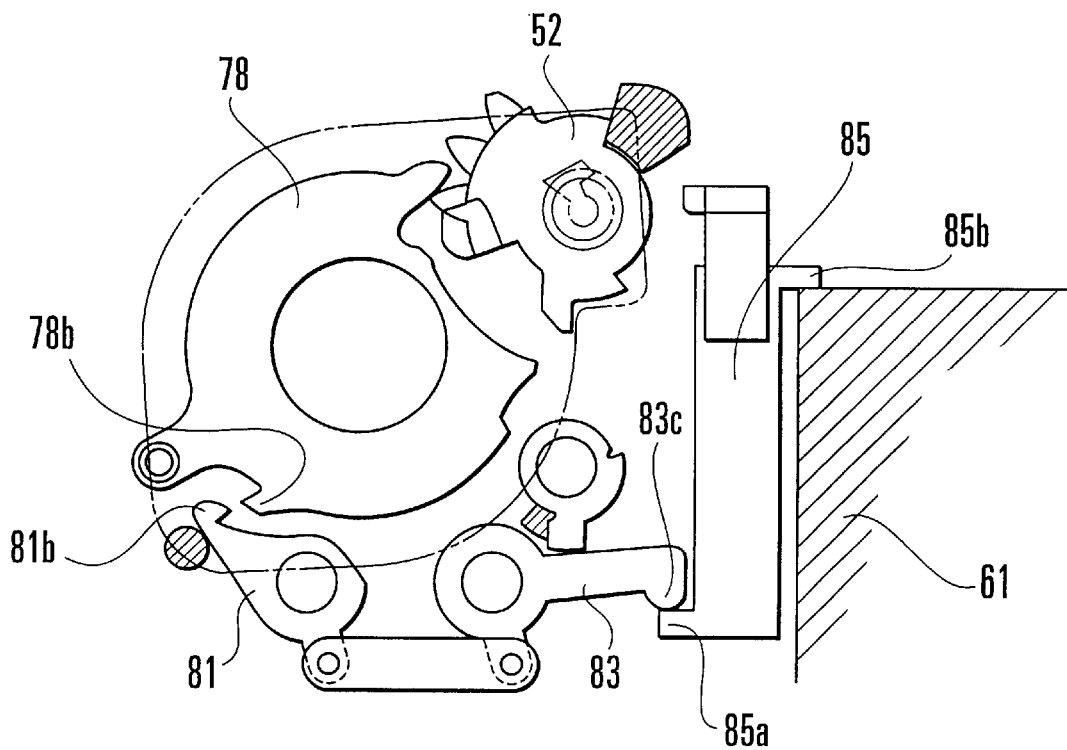
FIG. 14 shows also the lock mechanism according to the second embodiment.

FIG. 14 shows a state obtained immediately after completion of film rewinding. Upon completion of film rewinding, the photo-taking lens barrel 61 takes its stowed position. The slide lever 85 has its protruding part 85b pushed by the photo-taking lens barrel 61. The protruding part 85a of the slide lever 85 pushes the protruding part 83c of the interlocking lever (C) 83. The lock lever (B) 81 is caused to rotate counterclockwise by the parallel link mechanism described above. The claw part 81b disengages from the claw part 78b of the rotary lever 78 to render the rotary lever 78 rotatable. The rotary lever 78 can be rotated by turning the opening-and-closing knob 4 in that state.

Figure 15:
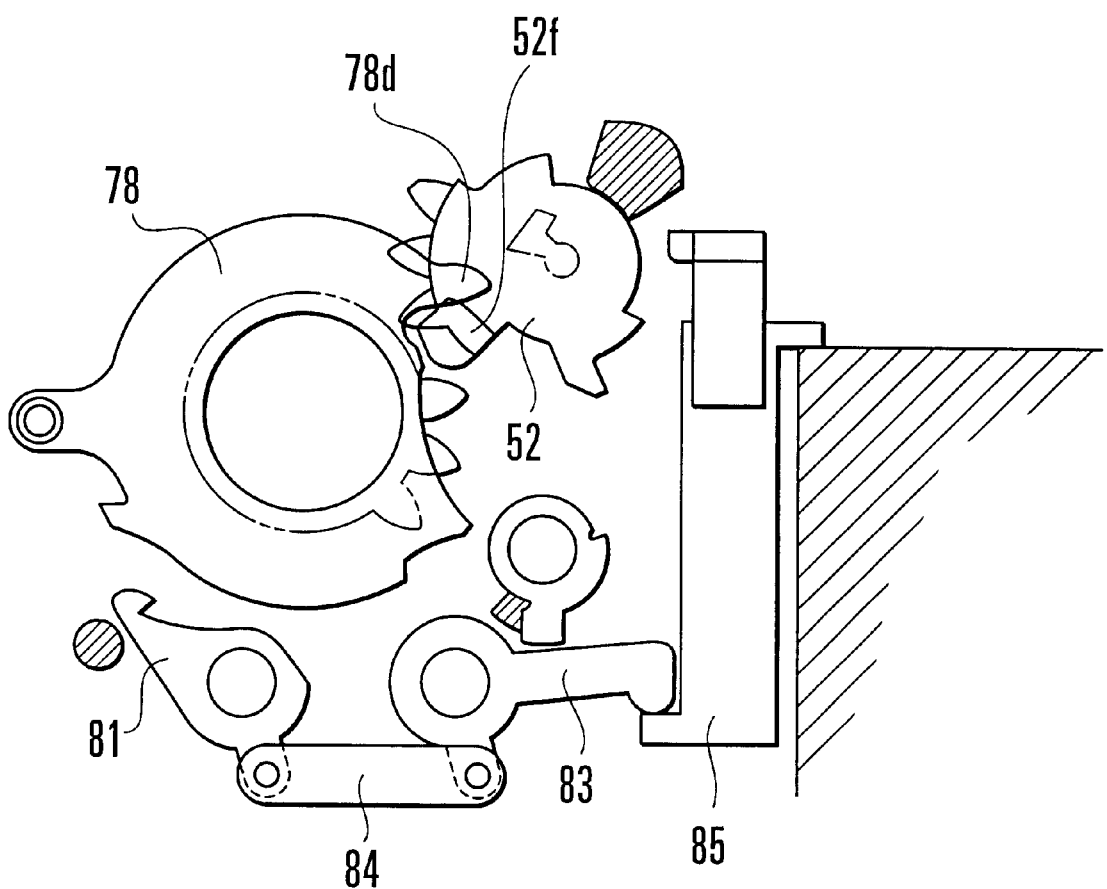
FIG. 15 shows also the lock mechanism according to the second embodiment.

FIG. 15 shows a state obtained while the opening-and-closing knob 4 is in process of being turned. With the opening-and-closing knob 4 thus turned, the opening-and-closing lever 5 shown in FIGS. 1(a) to 1(d) swings to cause the rotary lever 78 to rotate. By this rotation, the claw part 78d of the rotary lever 78 is caused to push the protruding part 52f of the door opening-and-closing lever 52. The door opening-and-closing lever 52 then rotates counterclockwise accordingly as the rotary lever 78 rotates clockwise. When the door opening-and-closing lever 52 rotates halfway, the rotation of the door opening-and-closing lever 52 is advanced by the above-stated toggle mechanism. Then, the rotation of the rotary lever 78 comes to follow that of the door opening-and-closing lever 52. This action is performed in such a way as to open the cartridge chamber cover 3 after the door of the cartridge 1 is closed. Then, the state of the device comes back to the state shown in FIG. 12(a).

Third Embodiment

A third embodiment of the invention is an improvement on the device for switching the state of the cartridge chamber cover 3 between a locked state and an unlocked state according to the position of the photo-taking lens barrel. Since almost all parts of the third embodiment are identical with those of the first embodiment described in the foregoing, the third embodiment is briefly described. The third embodiment thus also includes the mechanism shown in FIGS. 1(a) to 1(d) in the same manner as the first embodiment.

FIGS. 16(a) and 16(b) show a cartridge chamber in the third embodiment as viewed from above. In FIGS. 16(a) and 16(b), reference numeral 30 denotes a rotary lever corresponding to the rotary lever 8 in the first embodiment.

FIG. 16(a) shows a state obtained when the cartridge chamber cover is unlocked by the photo-taking lens barrel 61. FIG. 16(b) shows a state obtained when the photo-taking lens barrel 61 is at a drawn-out position.

The third embodiment also includes a toggle mechanism which is arranged in the same manner as that of the first embodiment. The door opening-and-closing lever 52 is abutting on the stopper 53 as shown in FIGS. 16(a) and 16(b). Therefore, the position of the slide lever 31 remains unchanged. In other words, since the claw part 30a of the rotary lever 30 is not hooked on the claw part 32a of the lock lever (B) 32, the lock lever (B) 32 cannot bring the rotation of the rotary lever 30 to a stop. The third embodiment is thus arranged to perform no Locking when the camera is not loaded with the cartridge 1.

Figure 17:
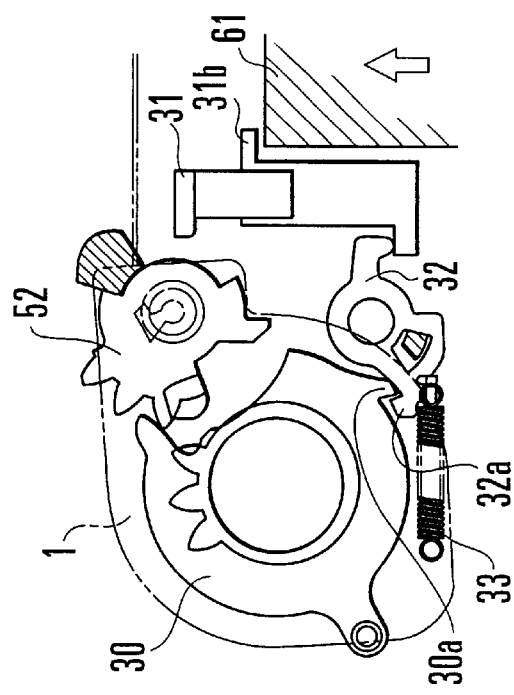
FIGS. 17(a) to 17(c) show also the lock mechanism according to the third embodiment.
Figure 17:
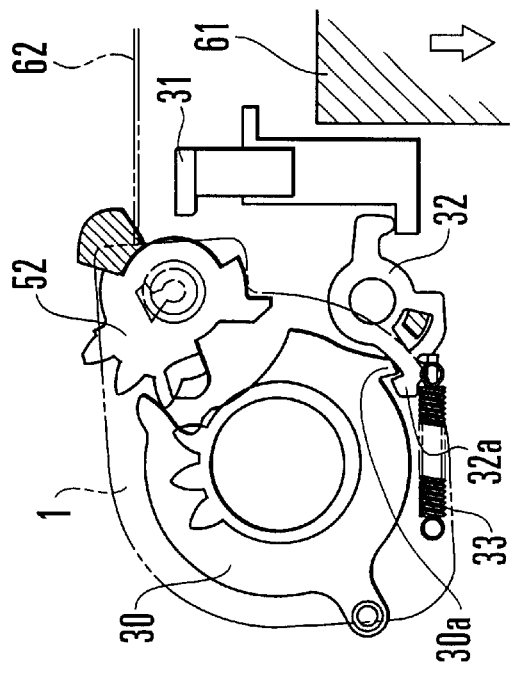
Figure 17:
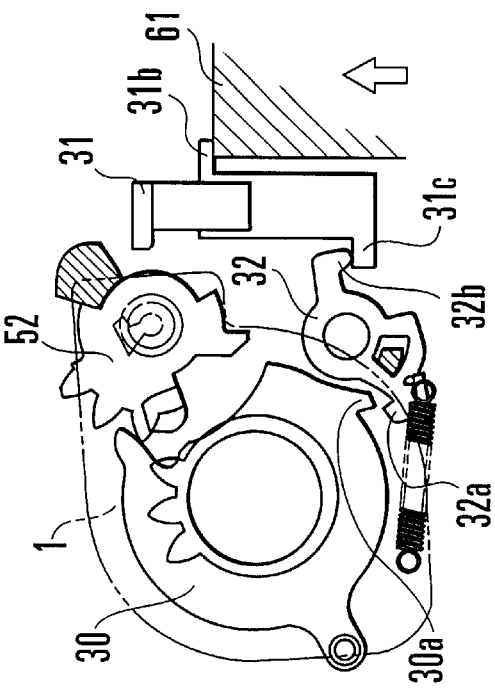

FIGS. 17(a), 17(b) and 17(c) show the cartridge chamber in the third embodiment as viewed from above in different states.

In the state shown in FIG. 17(a), the cartridge 1 is loaded, the film 61 is pulled out, and the photo-taking lens barrel 61 is at a drawn-out position within a photo-taking area. In this state, the door opening-and-closing lever 52 is open and, therefore, the slide lever 31 is no longer restricted by the door opening-and-closing lever 52. The lock lever (B) 32 which is being pulled by the tension spring 33 rotates clockwise to stop the rotary lever 30 from rotating by having its claw part 32a hooked on the claw part 30a of the rotary lever 30. In this state, the cartridge chamber cover 3 cannot be opened, because the opening-and-closing knob 4 cannot be turned.

In the state shown in FIG. 17(b), the cartridge is in process of loading, and the camera is in an off-state.

While the cartridge is in process of loading, the photo-taking lens barrel 61 is at a standby position which differs from its position obtained when the camera is not loaded with the cartridge. If the camera is turned off while the cartridge is in process of loading, the photo-taking lens barrel 61 does not move to a position where the photo-taking lens barrel 61 abuts on the claw part 31a of the slide lever 31. Therefore, the claw part 30a and the claw part 32a remain hooked on each other. The lock lever (B) 32 thus prevents the rotary lever 30 from rotating. It is impossible, in this state, to turn the opening-and-closing knob 4 and, therefore, the cartridge chamber cover 3 cannot be opened.

FIG. 17(c) shows a state obtained with the cartridge chamber cover 3 unlocked by the photo-taking lens barrel 61 after completion of film rewinding. Upon completion of film rewinding, the photo-taking lens barrel 61 moves further toward the surface of the film. The slide lever 31 is then pulled in with its claw part 31b abutting on the photo-taking lens barrel 61. Meanwhile, the claw part 31c of the slide lever 31 abuts on the claw part 32b of the lock lever (B) 32. The lock lever (B) 32 rotates to disengage its claw part 32a from the claw part 30a of the rotary lever 30 to render the rotary lever 30 rotatable. Therefore, in this state, the cartridge chamber cover 3 becomes openable by turning the opening-and-closing knob 4.

The following recapitulates the advantages of the embodiments disclosed above.

1) The device according to the invention is provided with first lock means for switching the state of the cartridge chamber cover between a locked state and an unlocked state by using a power for transporting a film, and second lock means for switching the state of the cartridge chamber cover between the locked state and the unlocked state by using a power for driving a photo-taking lens barrel. The device is arranged such that the cartridge chamber cover 3 can be locked without fail when the camera is loaded with the cartridge 1 and can be unlocked without using any drive source for unlocking, so that an increase in cost can be prevented. Further, since at least one of the two lock means is always acting, the device effectively prevents such an accident that the cartridge chamber cover opens while the film is in a pulled-out state or that the cartridge chamber cover is inadvertently opened before the index position of the cartridge is adjusted.

2) The arrangement for unlocking the cartridge chamber cover 3 for opening and closing the cartridge chamber according to the movement of the photo-taking lens barrel 61 obviates the necessity of any drive source solely for unlocking, so that an increase of cost otherwise necessary for this purpose can be prevented.

3) The cartridge chamber cover 3 is arranged to be openable and closable at any time, irrespectively of the position of the photo-taking lens barrel 61, when the camera is not loaded with any cartridge. Therefore, in loading the camera with a cartridge, the arrangement obviates the trouble of performing an unlocking operation on the cartridge chamber cover 3.

4) The cartridge chamber cover 3 is arranged to be locked by the first lock means while the film is in process of winding up and also to be locked by the second lock means according to the position of the photo-taking lens barrel 61 while the film is in process of rewinding. The arrangement effectively prevents the film from being accidentally exposed to light with the cartridge chamber cover 3 inadvertently opened by the user.

5) The door opening-and-closing lever 52 which is provided for opening and closing the film exit part of the cartridge 1 is arranged to be always at a closing position when the camera is loaded with no cartridge. Since the cartridge chamber cover 3 is arranged to be unlocked according to the position of the door opening-and-closing lever 52, the cartridge chamber cover 3 is unlocked without fail when the camera is loaded with no cartridge. The arrangement effectively improves the operability of the device as it obviates the necessity of the trouble of performing an unlocking operation on the cartridge chamber cover 3 in loading the cartridge.

6) At least a part of the switching means which is provided for switching the state of the cartridge chamber cover 3 between an unlocked state and a locked state is disposed in a dead space available between the photo-taking lens barrel and the cartridge chamber, as shown in FIG. 9(a). The use of the dead space effectively prevents the size of the camera from being increased.

7) The cartridge chamber cover 3 is locked while the film is being wound or rewound. Therefore, the cartridge chamber cover 3 is never unlocked while the photo-taking lens barrel is drawn out to a photo-taking area before completion of film rewinding. Therefore, the possibility of having the cartridge chamber cover 3 inadvertently opened by the user is eliminated by this arrangement.

What is claimed is:

1. A device for opening and closing a cover of a film cartridge chamber, comprising:
    an operation member for opening the cover;
    a first lock member arranged to take, when the cover is in a closed state, one of a locking state of locking the cover against an opening operation performed on said operation member and an unlocking state of unlocking the cover;
    film transport means for transporting a film, wherein said first lock member takes one of the locking state and the unlocking state in association with a film transporting action of said film transport means;
    a second lock member arranged to take, when the cover is in a closed state, one of a locking state of locking the cover against an opening operation performed on said operation member and an unlocking state of unlocking the cover; and
    a lens barrel arranged to be movable forward or backward along an optical axis and to hold an objective lens, wherein said second lock member takes one of the locking state and the unlocking state in association with the movement of said lens barrel along the optical axis.

2. A device according to claim 1, wherein said first lock member takes the locking state in association with a film feeding action of said film transport means.

3. A device according to claim 1, wherein said first lock member takes the unlocking state in association with a film rewinding action of said film transport means.

4. A device according to claim 1, wherein said second lock member takes the locking state in association with said lens barrel being drawn out forward, and takes the unlocking state in association with said lens barrel coming into a stowed state.

5. A device for opening and closing a cover of a film cartridge chamber, comprising:
    an operation member for opening the cover;
    a lock member arranged to take, when the cover is in a closed state, one of a locking state of locking the cover against an opening operation performed on said operation member and an unlocking state of unlocking the cover; and a lens barrel arranged to be movable forward and backward along an optical axis and to hold an objective lens, wherein, if a film cartridge is loaded in the film cartridge chamber, said lock member takes one of the locking state and the unlocking state in association with the movement of said lens barrel, and, if no film cartridge is loaded in the film cartridge chamber, said lock member is kept into the unlocking state.

6. A device according to claim 5, wherein, if a film cartridge is loaded in the film cartridge chamber, said lock member takes the locking state when said lens barrel is located in a forward position, and takes the unlocking state when said lens barrel is located in a backward position.

7. A device for opening and closing a cover of a film cartridge chamber, comprising:

an operation member for opening the cover;

a lock member arranged to take, when the cover is in a closed state, one of a locking state of locking the cover against an opening operation performed on said operation member and an unlocking state of unlocking the cover;

film transport means for transporting a film, wherein said lock member takes the locking state in association with a film transporting action of said film transport means; and a lens barrel arranged to be movable forward or backward along an optical axis and to hold an objective lens, wherein said lock member takes the unlocking state in association with the movement of said lens barrel along the optical axis.

8. A device according to claim 7, wherein said lock member changes from the locking state to the unlocking state in association with a backward movement of said lens barrel.

* * * * *

UNITED STATES PATENT AND TRADEMARK OFFICE
CERTIFICATE OF CORRECTION

PATENT NO.   : 6,442,352 B1 Page 1 of 1
DATED        : August 27, 2002
INVENTOR(S)  : Kenji Ito It is certified that error appears in the above-identified patent and that said Letters Patent is hereby corrected as shown below:

<u>Column 7,</u>
Line 10, delete "FIG. 1(a)" and insert -- FIG. 1(d). --.

Signed and Sealed this

Fourteenth Day of October, 2003

JAMES E. ROGAN
*Director of the United States Patent and Trademark Office*